May 15, 1934.  W. ALBERSHEIM ET AL  1,958,878
VISCOSITY METER
Filed May 17, 1928
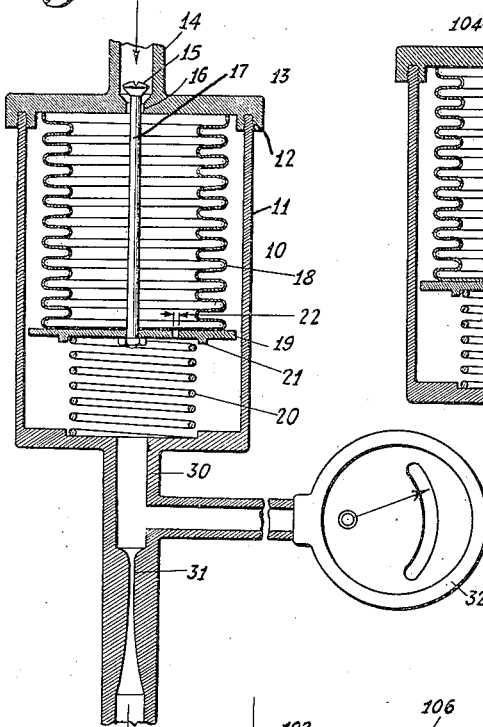
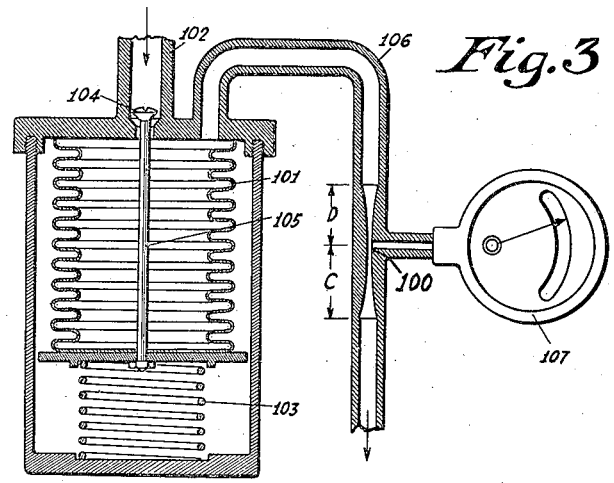
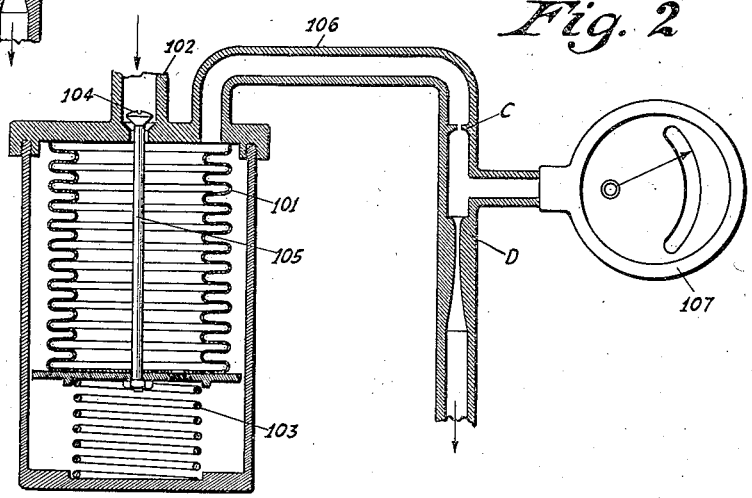
INVENTORS
W. J. ALBERSHEIM
BY H. S. KONHEIM
ATTORNEY Patented May 15, 1934

1,958,878

UNITED STATES PATENT OFFICE 1,958,878

VISCOSITY METER

Walter Albersheim and Harvey S. Konheim, New York, N. Y.

Application May 17, 1928, Serial No. 278,397

11 Claims. (Cl. 265—11)

In our copending application filed Mar. 31, 1928, Ser. No. 266,271, of which this application is a continuation in part, we have disclosed a viscosity meter which utilizes two orifices of different characteristics to determine the viscosity of the liquid flowing. In accordance with the said copending application the reaction of the liquid upon the two separate orifices is separately determined and then combined either mechanically or electrically to indicate the viscosity of the liquid.

It is an object of this invention to provide a direct reading viscosity meter having two separate orifices of predetermined characteristics and so arranged that the reaction of the liquid flowing, upon one of the orifices, indicates the viscosity of the liquid.

It is a further object of this invention to provide a viscosity meter having a minimum number of moving parts.

It is a further object to provide a viscosity meter which is cheap to construct, and which is highly efficient and accurate in its operation.

Finally it is an object of this invention generally to improve viscosity meters now known.

These and other objects of the invention will be readily apparent to those skilled in the art from the following description taken in connection with the accompanying drawing.

We have found that if we force a liquid successively through two orifices of different shapes, and maintain the pressure drop through one of them at a constant and predetermined value, the pressure drop through the other will be a function of viscosity alone, assuming the specific gravity to be substantially constant throughout the range of viscosity readings. Accordingly, therefore, the scale of a pressure gage indicating this second pressure drop may be calibrated in units of viscosity directly. It is understood of course, that the meter is connected to a line having a pressure high enough to maintain within the instrument the pressures for which the same is designed.

The following is a mathematical proof of our discovery set forth above:

In our aforesaid copending application we have shown that the pressure drop thru any orifice for a liquid flowing without turbulence may be expressed by the following equation:

(1) $\quad \Delta P = av^2 + bv\theta$

Where $\Delta P$ = pressure drop $v$ = speed $\theta$ = viscosity $a, b$ = sonstants.

We chose two orifices having the following characteristics (2) $\quad av^2 + bv\theta = \text{constant} = c$ (3) $\quad dv^2 + ev\theta = P$ where $d$, and $e$ are constants.

Solving Equations (2) and (3) for $v^2$ (4) $\quad v^2 = \dfrac{ce - bP}{ae - bd}$ Solving (2) for $\theta$ (5) $\quad \theta = \dfrac{c - av^2}{bv}$ Substituting in (5) the value of $v^2$ from 4.

(6) $\quad \theta = \dfrac{c - a\left(\dfrac{ce - bP}{ae - bd}\right)}{b\sqrt{\dfrac{ce - bP}{ae - bd}}}$ It will be seen from Equation (6) that the viscosity $\theta$ is expressed in terms of only one variable, to wit, P.

Now, matters will be considerably simplified without detracting from the generality of this solution, if we chose one of the orifices as a pure speed device, that is, one in which the pressure drop varies only as the square of the velocity. An orifice having this speed characteristic is either of the sharp edged or bend types. The other orifice is chosen as a pure friction restricted passage in which the pressure drop is a product of the viscosity and velocity. Both of these types of orifices are now fully described in our aforesaid copending application.

If we keep the pressure across the first mentioned speed orifice constant, we have the relation from Equation (2).

(7) $\quad v^2 = \text{constant} = c$

Similarly for the friction orifice in accordance with Equation (3) we have:

(8) $\quad ev\theta = P$ and (9) $\quad \theta = \dfrac{P}{ev}$ substituting the value of $v$ from (7).

(10) $\quad \theta = \dfrac{P}{e\sqrt{c}} = P \times \text{constant}.$

It will thus be seen, that under the conditions assumed, namely, with two orifices one having a pure speed characteristic and the other a pure velocity times viscosity or friction characteristic, if we keep the pressure drop through the speed orifice constant, the readings on a pressure gage associated with the other orifice will indicate viscosity directly as a linear function.

It will be now demonstrated mathematically that the pressure drop in the friction orifice may be kept constant, and the viscosity will be indicated by the gage associated with the speed orifice described above.

By assumption from 8 we have:

(11)  $v\theta = \text{constant.} = c$ and from 7.

(12)  $c_1 v^2 = P$ $$\theta = \frac{c}{v} = \frac{c}{\sqrt{P/c_1}} = \frac{c\sqrt{c_1}}{\sqrt{P}}$$

(13)  $\theta = \text{constant} \times \dfrac{1}{\sqrt{P}}$

From Equation 13 it will be seen that under these conditions the viscosity is an inverse function of the square root of the pressure drop in the speed orifice.

Obviously the inverse square root function may be converted to a straight line reading by any of the well known means for accomplishing similar results.

The manner in which the present invention is carried out will be more readily understood from the following description taken in connection with the accompanying drawing in which:

Fig. 1 is a longitudinal sectional view showing the interior of the instrument; and Figs. 2 and 3 are similar views of modifications of the invention shown in Fig. 1.

Referring in detail to the drawing a specific embodiment of the invention is shown. The meter 10 is seen to comprise a vessel having a cylindrical casing 11 threaded at 12 to receive and hold a cover 13, to which is joined an inlet pipe 14. The pipe 14 is connected to the source of liquid not shown. A valve 15 seated at 16 in the cover 13 and provided with the stem 17 is provided to vary and control the flow of liquid into the casing. A first chamber or bellows member 18 having a base plate 19 is held in liquid tight engagement with the cover 13 as shown.

The bellows 18 is of the general type of apparatus known as a sylphon bellows, and consists of a plurality of sections, as shown. The device is designed to be elongated with internal pressure increases, and such elongation varies directly as the pressure. As the pressure is released the sections contract due to the spring action inherent therein. Obviously, any other device which produces a linear movement proportional to the internal pressure may be substituted for the bellows without departing from the spirit of this invention. In fact any device which produces a movement proportional to the internal pressure is suitable.

A spring 20 seated in the base of the second chamber or casing engages with the base plate 19. A ring 21 or any other suitable means is fixed to the bottom of plate 19 to hold the spring 20 in place. The spring 20 serves to increase the tension of the bellows, and may be dispensed with in the event that the bellows itself has sufficient elasticity. The valve stem 17 is joined in fixed relation to the plate 19, and movement of the plate as the bellows expands and contracts is thus imparted to the valve 15.

An orifice 22 is cut in the plate 19, the particular position of the orifice in the plate being unimportant. The orifice is of the sharp edge type in which the pressure drop is substantially proportional to the square of the velocity of the liquid passing thru. The pressure drop thru this orifice due to the product of viscosity times velocity is negligible.

An outlet pipe 30 is connected to the bottom of casing 11. In the pipe 30 is placed an orifice 31 having a shape generally as shown and in which the pressure drop is due only to the product of the viscosity times the velocity of the liquid flowing. Before the orifice 31 is connected a pressure gage 32, whose scale may be calibrated in viscosity units.

The operation of the device is as follows:

The liquid to be tested enters into the bellows 18 thru the pipe 14 and the pressure of the liquid expands the bellows causing the valve 15 to approach its seat 16 to cut down the admission of liquids. In the meantime the liquid is flowing thru the orifice 22. The tension in the bellows and also that in the spring 20 is predetermined to so actuate the valve 15 that the pressure drop thru the orifice 22 is kept substantially constant. Suppose for example the speed of flow into the bellows increases. This means a greater pressure drop thru 22 and a comparatively less pressure in the casing external of the bellows, thus permitting the valve to reduce the flow and restore conditions to the state of equilibrium, namely, a fixed pressure drop thru 22. Of course, the stabilizing action works in the reverse way if there should be a tendency for the velocity of liquid flowing to decrease. Under this condition the valve would open to compensate for reduction in speed.

Now we have the condition of the liquid being delivered to two successive orifices with the further condition that the pressure drop thru the first orifice is kept substantially constant. As has been demonstrated above, the pressure drop in the second orifice is proportional to the viscosity of the flowing liquid and may be read directly from a properly calibrated gage. The second orifice 31 is of the friction type and the pressure gage 32 is properly calibrated to read the viscosity of the liquid flowing. The liquid passing thru 31 may be disposed of in any suitable manner. For example, in using the present device on an internal combustion engine to measure the viscosity of oil, the oil may be returned to the crank case.

Referring in detail to Fig. 2 there is shown a modified form of the invention. The liquid to be measured is conducted to the bellows 101 by the pipe 102 at a variable pressure $P_1$. The bellows 101 is reinforced by means of a spring 103 constructed and arranged to increase the elasticity of the bellows to a certain predetermined value $P_2$. A valve 104 operable by the stem 105 which is joined to the bellows as shown serves to control the flow of liquid into the bellows. It will be clear that other mechanical expedients may be substituted for the bellows in the same manner as explained in connection with Fig. 1. A pipe 106 conducts the liquid from the bellows to a first orifice C. From the orifice C the liquid is passed thru a second orifice D and from D the liquid discharged at atmospheric pressure. A gage 107 properly calibrated indicates the viscosity of the liquid flowing corresponding to the pressure $P_3$.

The operation of this device is as follows:

The liquid under variable high pressure $P_1$ flows thru the valve 104 into the bellows 101. Due to the spring action of the bellows in operating the valve 104 the pressure $P_2$ is maintained substantially constant. From the bellows 101 the liquid flows through the first restricted passage or orifice C and thence through the second restricted passage or orifice D. From D the liquid flows out to atmospheric pressure. In C the pressure will be reduced to an amount $P_3$ which is measured by the gage 107. The orifice D reduces the pressure from $P_3$ to atmospheric.

The combined resistance of C and D will cause a pressure drop partly proportional to the square of the velocity ($v$) and partly to the product of speed and viscosity ($\theta$), thus:

(14) $\quad av_2 + bv\theta = P_2$

Similarly the orifice D alone will cause a drop composed of dynamic acceleration and friction pressure:

(15) $\quad mv^2 + nv\theta = P_3$ where $a$, $b$, $m$, and $n$ are constants dependent on the shapes of the orifices; $P_2$ is constant, and $P_3$ is measured by the gage 107; and $\theta$ is the viscosity of the liquid.

Solving Equations 14 and 15 for $\theta$ we have:

(16) $\quad \theta = \sqrt{\dfrac{(mP_2 - aP_3)^2}{(bP_3 - nP_2)(mb - an)}}$

It therefore follows that for every value of $P_3$ there is one and only one value of $\theta$ or viscosity and gage 107 when properly calibrated will indicate this value directly.

In Fig. 3 we have shown a modification of the invention which is identical with that shown in Fig. 2 except for the type of orifice used. Corresponding parts have been given the same reference numerals in both Figs. 2 and 3.

The orifice shown in Fig. 3 is composed of the sections C and D which correspond to the separate orifices C and D of Fig. 2. The gage 107 is connected at the point 100 corresponding to the point in Fig. 2 between orifices C and D. In accordance with the solution of Equation 16 which applies equally well to Fig. 3 as to Fig. 2 readings of the gage 107 when calibrated indicate viscosity directly.

While we have disclosed specific embodiments of the invention in some detail it will be readily apparent that many changes in structure may be made without departing from the spirit of this invention. We therefore, do not intend to be limited in the scope of this invention, except as defined in the appended claims.

Having thus described our invention, we claim:

1. A viscosity meter comprising in combination, a first orifice, a second orifice, means to conduct a liquid successively thru said first and second orifices, means to maintain constant the pressure drop thru one of said orifices, and means to measure the pressure drop thru the other of said orifices.

2. A viscosity meter comprising in combination, a first orifice, a second orifice, means to conduct a liquid successively thru said first and second orifices, means to maintain constant the pressure drop thru said first orifice, and means to measure the pressure drop thru the other of said orifices.

3. A viscosity meter comprising in combination a vessel, movable means dividing said vessel into a first chamber and a second chamber, means connected to said first chamber to permit the flow of liquid thereinto, said first mentioned means being provided with an orifice whereby liquid may flow from said first chamber into said second chamber, said orifice being shaped to produce a pressure drop by the flow of liquid therethru which is substantially proportional to the square of the velocity of the flowing liquid, means connected to said second chamber to permit the flow of liquid therefrom, there being a second orifice mounted in said last mentioned means, said orifice being shaped to produce a pressure drop by the flow of liquid therethru which is substantially proportional to the product of the viscosity and velocity of the liquid flowing, means operated by said movable means to control the flow of liquid into said first chamber, and means having a member movable in accordance with the pressure variations in the second chamber.

4. A viscosity meter comprising in combination, a first chamber, a second chamber, valve means to control the flow of liquid into said first chamber, said first and said second chambers being separated by an elastic wall which is movable in accordance with the difference in pressures between said two chambers, means connecting said valve to said wall whereby the flow of liquid into said first chamber is controlled by the movement of said wall, said wall being provided with an orifice through which the liquid flows in passing from said first chamber to said second chamber, a second orifice connected to said second chamber and forming an outlet for the liquid flowing out of said meter, and means to measure the pressure drop through said last mentioned orifice.

5. A viscosity meter having a first and a second orifice comprising in combination, means to conduct a liquid successively through said first and said second orifices, means to regulate the pressure drop of the liquid flowing through one of said orifices, and means to measure the pressure drop through the other of said orifices.

6. A viscosity meter comprising in combination, a first chamber, a second chamber, means to conduct a liquid to said first chamber, said chambers including a movable wall and orifice means for providing communication between said chambers, means operated by said movable wall whereby the speed of flow of liquid through said orifice is maintained substantially constant, the second chamber being provided with a second orifice, and means to measure the pressure drop of flow of liquid out of said second chamber through said orifice.

7. A viscosity meter comprising in combination, a first chamber, a second chamber, means to conduct a liquid to said first chamber, said chambers including a movable wall and orifice means for providing communication between said chambers, means operated by said movable wall to control the speed of flow from said first chamber to said second chamber through said orifice, the second chamber being provided with a second orifice, and a pressure responsive device having a member movable in accordance with the pressure in said second chamber.

8. A viscosity meter comprising in combination, a first chamber, a second chamber, orifice means providing communication between said chambers whereby liquid may flow from said first chamber into said second chamber, said chambers including a movable wall responsive to the flow of liquid into said first chamber, means operated by said movable wall whereby the speed of flow of the liquid through said orifice is maintained substantially constant, the second chamber being provided with a second orifice, and means to indicate the pressure drop through said second orifice.

9. A viscosity meter comprising in combination, a first chamber, a second chamber, said chambers including a movable wall having orifice means for providing communication between said chambers, said orifice being shaped to produce a pressure drop therethrough proportional to the square of velocity of the liquid flowing, said second chamber having a second orifice shaped to produce a pressure drop therethrough which is proportional to the product of the viscosity and velocity of the liquid flowing, means operated by said movable wall whereby the speed of the flow of liquid through said first orifice is maintained substantially constant, and means to indicate the pressure drop through said second orifice.

10. A viscosity meter comprising a passage for a liquid, means forming a first orifice in said passage, means including a movable wall responsive to the liquid pressure in said passage for regulating the pressure drop of liquid flowing through said orifice, means forming a second orifice in said passage at the outlet side of said first orifice, and means for measuring the pressure drop of the liquid through said second orifice.

11. A viscosity meter comprising a passage for a liquid, a movable wall in the path of the liquid having an orifice therethrough, means controlled by said movable wall for regulating the flow of liquid through said orifice, a second orifice in said passage at the outlet side of said first-mentioned orifice, and means for measuring the pressure drop of the liquid through said second orifice.

WALTER J. ALBERSHEIM.
HARVEY S. KONHEIM.